June 29, 1965  R. E. KIRKPATRICK  3,191,753
BUNK FEEDER
Filed April 2, 1962  3 Sheets-Sheet 1
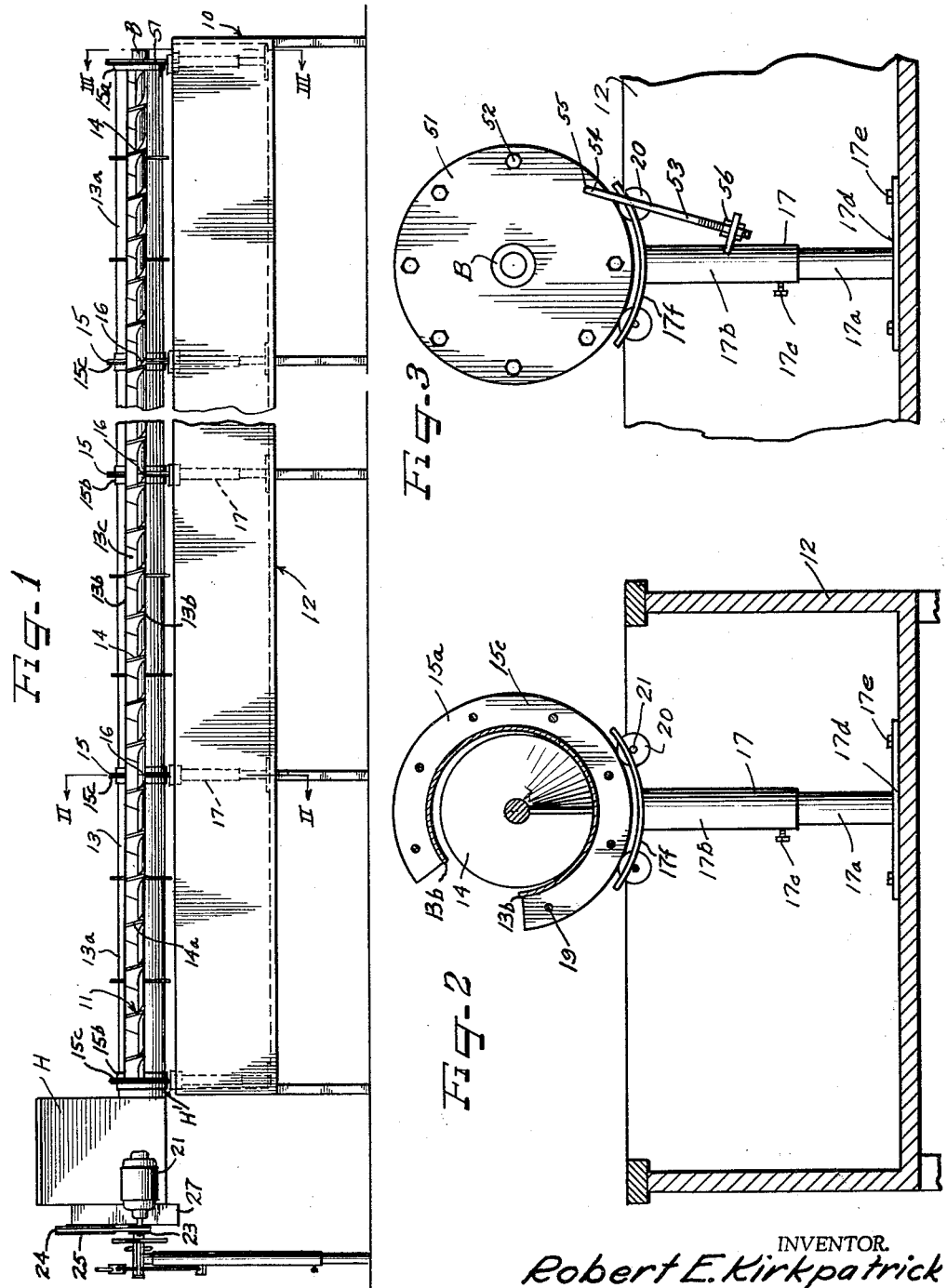
INVENTOR.
Robert E. Kirkpatrick
BY
Rudolph L. Lowell
ATTORNEYS

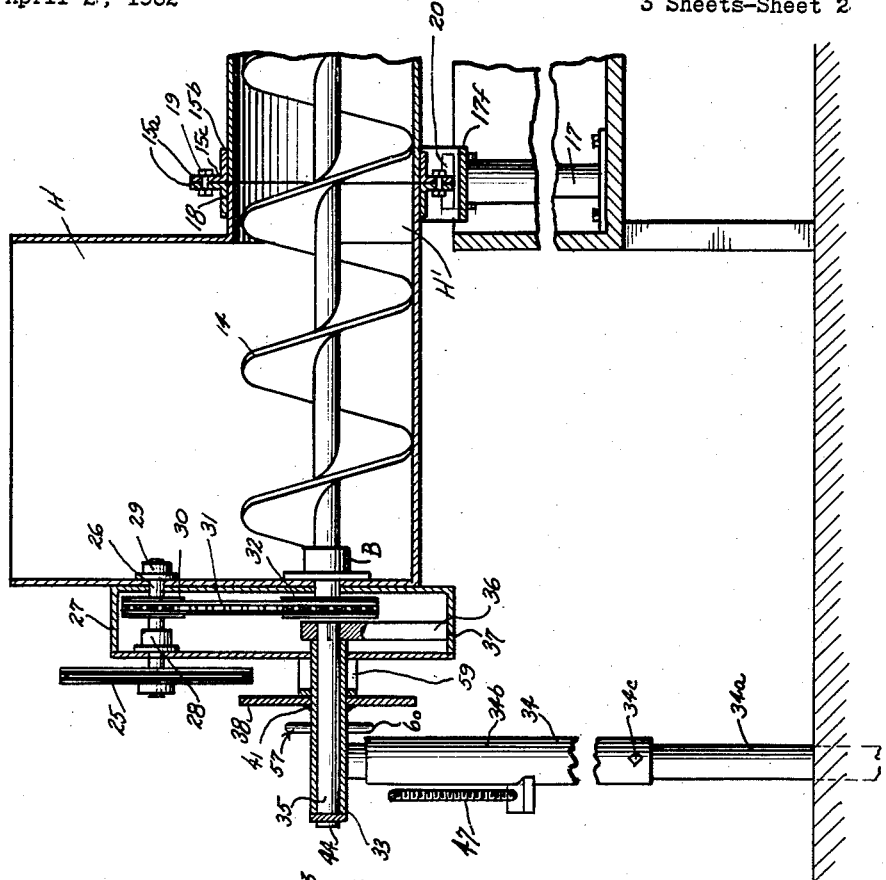

June 29, 1965   R. E. KIRKPATRICK   3,191,753
BUNK FEEDER
Filed April 2, 1962   3 Sheets-Sheet 3
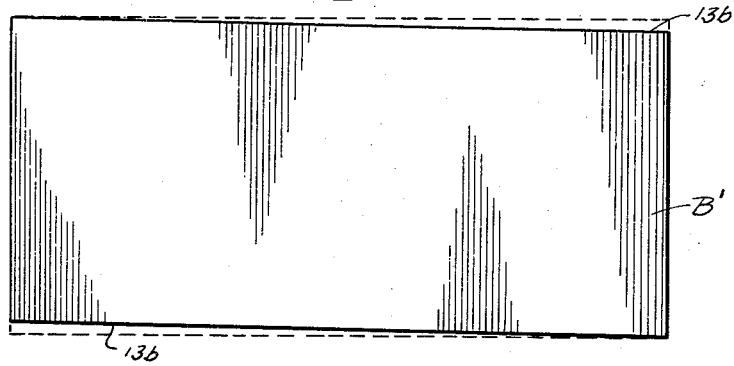
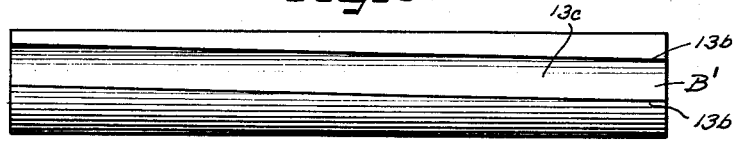
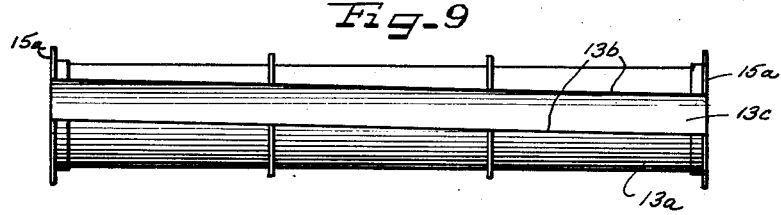
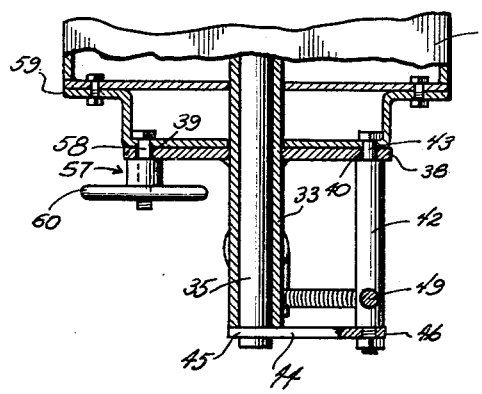
INVENTOR.
Robert E. Kirkpatrick
BY
ATTORNEYS

United States Patent Office 3,191,753
Patented June 29, 1965

3,191,753
BUNK FEEDER
Robert E. Kirkpatrick, 506 N. Taft, Humboldt, Iowa
Filed Apr. 2, 1962, Ser. No. 184,104
11 Claims. (Cl. 198—64)

This invention relates generally to a new and improved bunk type feeder for transporting silage from a hopper to a feeding trough.

The primary object of this invention is to provide an improved conveyor having components which may be readily and conveniently assembled with a minimum of effort.

Still another object of this invention is to provide a conveyor having an inclined slot capable of evenly distributing a full even pile of silage along the length of the feed trough or bunk.

Still another important object of this invention is to provide a method for forming auger tube sections for economical manufacture and assembly together with a minimum of effort.

Yet another object of this invention is to provide a new and improved mechanism for positioning the inclined slots in the auger tube sections in proper relation with respect to one another so that the silage may be evenly distributed along the length of the feed trough.

According to an important feature of this invention, a new and improved clamping device is provided for joining the sections together in such a way so that feed or silage being discharged from the conveyor will not be obstructed.

Other and further objects and adavntages of this invention will more fully become apparent in view of the following detailed description taken in conjunction with the accompanying drawings illustrating therein a single embodiment and in which:

FIGURE 1 is a side elevation of a bunk feeder having my novel conveyor disposed therein, in accordance with important principles of this invention;

FIGURE 2 is an enlarged fragmentary vertical section taken substantially on the line II—II looking in the direction indicated by the arrows as shown in FIGURE 1;

FIGURE 3 is an enlarged vertical section taken substantially on the line III—III looking in the direction indicated by the arrows, as shown in FIGURE 1;

FIGURE 4 is an enlarged end elevation of the bunk feeder illustrated in FIGURE 1 only with the feed trough omitted;

FIGURE 5 is an enlarged fragmentary vertical section through the conveyor illustrating the conveyor drive;

FIGURE 6 is a fragmentary cross sectional view taken substantially on the line VI—VI looking in the direction indicated by the arrows, as seen in FIGURE 4;

FIGURE 7 is a top plan view of a sheet of material used in the formation of a tube section;

FIGURE 8 is a side elevation of the blank shown in FIGURE 7 after it has been rolled to shape; and FIGURE 9 is a side elevation of a tube section of the type employed on the conveyor.

As shown on the drawings:

The reference numeral 10 indicates generally a bunk feeder for forage and like material to feed livestock. The bunk feeder 10 includes a conveyor 11 mounted on or in a feed trough or bunk 12. The conveyor 11 is comprised of a conveyor tube 13 which houses an auger 14 supported at opposite ends on bearings indicated at B—B. The conveyor tube includes a series of identical conveyor tube sections 13a which are secured together in end-to-end relation by means of a series of tube section clamps 15.

The auger 14 is comprised of a series of auger sections 14a which are all equal in length with respect to one another and with respect to the tube sections 13a. The auger sections 14a are secured or keyed together in end-to-end relation as indicated generally at 16.

In order to support the auger tube 14 within the feed trough, a series of vertically adjustable legs or stands 17 are provided. Each of these stands are essentially identical and include a pair of telescoped leg sections 17a and 17b (FIGURE 2). A screw 17c is provided to secure the sections 17a and 17b in adjusted position with respect to one another. From a study of FIGURE 2, it will further be seen that the leg section 17a has a foot flange 17d which is bolted at 17e to the bottom of the bunk 12.

The clamps 15 for securing the tube sections 13a together are each comprised of a pair of angular C-shaped clamp sections 15a—15a. The sections 15a—15a each include generally C-shaped horizontal and vertical legs 15b and 15c. The horizontal leg 15c is suitably attached to the associated tube section 13a such as by a weld as indicated at 18 (FIGURE 5). The vertical legs of each pair of clamp sections are joined together by means of a series of fasteners as indicated at 19.

As noted in FIGURE 2, the stand 17 is provided with an arcuate flange 17f mounted on the upper section 17b. Secured to the arcuate flange 17f are a pair of rollers 20. These rollers are journaled on roller support shafts 21 which are secured to the arcuate flange 17f. It will be noted that the vertical legs 15c of the joined together clamp sections 15a—15a are supported on the rollers 20. The rollers have a width substantially greater than the combined width of the joined together vertical flanges 15c to insure continued engagement between these engaged together surfaces.

A hopper H is joined with the conveyor tube 13 in much the same way as the tube sections 13a are joined together, as shown in FIGURE 5. In this regard, it will be noted the hopper has a tubular section H' at one of its sides and an augular C-shaped clamp section 15a is secured at its outer side in the same manner as previously described. The fasteners 19 are employed to secure the conveyor tube 13 with the tubular section H' of the hopper.

In order to drive the auger 14, a motor 21 is mounted on the hopper H. The motor has a drive shaft 22 which carries a pulley 23 for driving a belt 24. A second pulley 25 is mounted on a shaft 26 which is journaled on a gear box 27 and on the hopper H as indicated at 28 and 29. A sprocket 30 is mounted on the shaft 26 and it carries a chain 31 connected with a second sprocket 32, the sprocket 32 being mounted on the end of the conveyor 14. Thus, by energizing the motor 21 and causing the drive shaft 22 to rotate, the auger 14 will be rotated to cause feed to move from the hopper the length of the conveyor tube 13. As the silage is moved along the length of the conveyor tube 13, it is caused to be discharged into the bunk 12.

According to important features of the present invention, the conveyor tube and each of its sections are provided with spaced inclined slot edges 13b—13b which together define a continuous inclined conveyor discharge slot 13c at one side thereof. This inclined slot enables silage to flow freely and evenly into the bunk 12 without any pile-up of silage at the end of the bunk. By employing a conveyor system of the type described, it is no longer necessary that the silage be pre-mixed, also.

According to still further features of the present invention, means are provided for adjusting the inclined slots 13c of the sections defining the conveyor tube 13. To this end, a sleeve 33 is attached to a hopper support stand 34. The hopper support stand 34 is very similar to the conveyor support stand 17 in that it is provided with telescoped sections 34a and 34b and an adjusting screw 34c (FIG. 5).

A rotary shaft 35 is journaled within the sleeve 33 and joined at one end with a hopper rotating radial arm 36, the arm 36 being fixedly connected to the hopper H and more particularly to the gear box 27 by a weld or the like at 37.

A plate 38 having a pair of slots 39 and 40 is fixedly secured by a weld 41 to the sleeve 33. An axial support arm 42 is disposed in parallel relation to the sleeve 33 (FIGURE 6) and journaled at 43 in slot 40.

A radial arm 44 has an end 45 secured with the rotary shaft 35. An opposite end 46 of the arm 44 is secured to the axial support arm 42.

An adjusting screw 47 is secured by a fastener 48 to the hopper stand 34. The adjusting screw 47 is threaded through the axial support arm 42 as indicated at 49 in FIGURE 6. A crank 50 is mounted on an opposite end of the screw 47 so that upon turning the crank 50, the adjusting screw 47 is rotated which in turn causes the radial arm 44 and the axial support arm 42 to be rotated as well as the rotary shaft 35. The motion transmitted to the rotary shaft 35 is further transmitted to the hopper rotating radial arm 36 causing the hopper H as well as the conveyor tube 13 to rotate.

A conveyor tube end closure plate 51 is secured by means of fasteners 52 to the endmost clamp section 15a. According to still further features of this invention, detachable means in the form of arm 53 has a turned end 54 secured in a hole 55 in the plate 51. The opposite end of the arm 53 is secured by fasteners 56 to the stand 17. Thus, the endmost tube section attached to the closure 51 is held rigidly at one end by means of the detachable arm 53.

After the inclined slot edges 13b—13b have been adjusted with respect to one another to provide the desired angle of inclination, through the rotation of the crank 50, a locking device 57 is locked to secure the twisted conveyor tube 13 in its adjusted position. The locking device 57 includes a threaded bolt 58 which extends through a bracket 59 (FIGURE 6) as well as through the plate 38 and a hand wheel 60 is mounted on the threaded end of the bolt 58. When the hopper H is rotated, the bolt 58 will move in the arcuate slot 39 and the wheel 60 can be turned to lock the fixed plate 38 to the rotated hopper H when the conveyor slot edges have been disposed in the desired relationship with respect to one another.

Other features of this invention concern the method of forming the tube sections 13a, as shown in FIGURES 7-9. To this end, a sheet of metal such as sheet steel is cut into equal lengths to form blanks as indicated at B' (FIGURE 7). This blank is then cut to form inclined edges 13b—13b at opposite margins thereof. The blank B' is then rolled into a generally C-shaped configuration as shown in FIGURE 8. The clamp sections 15a—15a are then welded to opposite ends of the tube section 13a as shown in FIGURE 9.

It will be understood that modifications and variations may be effected without departing from the scope of the novel concepts of the present invention.

I claim as my invention:
1. An adjustable livestock feeder comprising:
 (a) an elongated tube having a slot extending from end-to-end thereof and including an inlet end and an opposite end,
 (b) a driven auger disposed in and extending from end-to-end through said tube for rotation in a direction for feeding through said tube toward said opposite end,
 (c) a plurality of stands disposed beneath and supporting said tube at longitudinally spaced points,
 (d) means rigidly connecting said opposite end of the tube to one of said stands,
 (e) each of the other stands having means rotatively supporting the tube, and
 (f) means for imparting torque to the tube adjacent its inlet end for twisting the tube for positioning the slot at a selected angle of incline downwardly from the inlet end to the opposite end of the tube.

2. An adjustable conveyor and dispenser comprising:
 (a) an elongated tube having an inlet end and an opposite end and provided with a slot extending from end-to-end thereof,
 (b) a driven auger extending longitudinally through the tube and rotating in a direction for conveying material from the inlet end to said opposite end,
 (c) a plurality of longitudinally spaced stands supporting said tube,
 (d) means immovably securing one end of the tube to one of said stands,
 (e) each of said other stands having means rotatively supporting the tube, and
 (f) means connected to the tube, remote from said first mentioned stand, for imparting torque to the tube for causing the tube to turn relative to the other stands and be twisted to position said slot at a selected angle of incline downwardly from said inlet end to the opposite end whereby material being conveyed through the tube by the auger will be discharged from said slot substantially uniformly from end-to-end of the tube.

3. An adjustable conveyer and dispenser comprising:
 (a) an elongated tube having a longitudinally extending slot,
 (b) a driven auger operating in said tube for conveying material longitudinally in one direction through the tube,
 (c) means immovably supporting one end of said tube, and
 (d) means for imparting torque to the tube near the other end thereof for twisting the tube to cause the slot to assume a selected volute form.

4. An adjustable conveyor and dispenser comprising:
 (a) an elongated tube having a longitudinal extending slot,
 (b) a driven auger disposed in said tube for conveying material in one direction longitudinally through the tube,
 (c) means immovably supporting the end of the tube toward which the material is conveyed,
 (d) means rotatively supporting the tube adjacent the other end thereof, and
 (e) means for imparting torque to the tube near said last mentioned end for twisting the tube to cause the slot to assume a selected volute form inclined downwardly toward the first mentioned tube end.

5. An adjustable livestock feeder comprising:
 (a) an elongated tube having at least one slot extended from end-to-end thereof and including an inlet end and an opposite end,
 (b) a driven conveyer means extended longitudinally through the tube and movable in a direction for carrying material from the inlet end to said opposite end,
 (c) means for rotatably supporting said tube,
 (d) means immovably supporting one end of the tube, and
 (e) means for imparting torque to the tube near the other end thereof for causing the tube to twist to position said slot at a selected angle of incline downwardly from said inlet end to the opposite end whereby material being moved through the tube by the conveyer means will be discharged from said slot substantially uniformly from end-to-end of the tube.

6. An adjustable livestock feeder comprising:
 (a) an elongated tube having at least one slot extended from end-to-end thereof and including an inlet end and an opposite end,
 (b) a driven auger extended longitudinally through the tube and rotatable in a direction for carrying material from the inlet end to said opposite end, (c) means for rotatably supporting said tube, (d) means immovably supporting one end of the tube, and (e) means for imparting torque to the tube near the other end thereof for causing the tube to twist positioning said slot at a selected angle of incline downwardly from said inlet end to the opposite end whereby material being moved through the tube by the auger will be discharged from said slot substantially uniformly from end-to-end of the tube.

7. A conveyor for evenly distributing a livestock feed along the length of a feed bunk comprising:

(a) an auger unit including a motor driven auger and an auger tube, (b) a feed hopper secured to one end of said tube with said auger extended into the feed hopper, (c) said tube including a series of tube sections each having a pair of inclined spaced slot edges at one side, (d) said auger being comprised of a series of auger sections secured in end-to-end assembly together, (e) clamp means for joining said tube sections in end-to-end assembly together, with said inclined slot edges on each of said tube sections being in alignment with the slot edges on adjacent tube sections, (f) said clamp means including a series of angular C-shaped clamp sections secured on the exterior of said sections leaving the slot defined by the slot edges unobstructed, (g) said clamp means having means securing vertical legs of said angular C-shaped clamp sections in assembly together, (h) means for fixing one end of said tube against rotation, and (i) means connected to an opposite end of said tube for rotating the tube to an adjusted position.

8. A conveyor for evenly distributing a livestock feed along the length of a feed bunk comprising:

(a) an auger unit including a motor driven auger and an auger tube, (b) a feed hopper secured to one of said tube with said auger extended into the feed hopper, (c) said tube including a series of tube sections each having a pair of inclined spaced slot edges at one side defining a continuous uninterrupted tube slot, (d) stands supporting said tube at the junctions of said tube sections, (e) said auger being comprised of a series of auger sections secured in end-to-end assembly together, (f) clamp means for joining said tube sections in end-to-end assembly together with said inclined slot edges on each of said tube sections being in alignment with the slot edges on adjacent tube sections, (g) said clamp means including a series of angular C-shaped clamp sections secured on the exterior of said sections leaving the slot defined by the slot edges unobstructed, (h) said clamp means having means securing vertical legs of said angular C-shaped clamp sections in assembly together, (i) rollers mounted on said stands, with said vertical legs of each joined together pair of said clamp sections being supported on said rollers, (j) means for adjustably fixing one end of said tube against rotation, and (k) means including a locking device connected to an opposite end of said tube for rotating the tube on said rollers and locking the rotated tube and its slot in an adjusted position.

9. A conveyor for evenly distributing an animal feed along the length of a feed bunk comprising:

(a) an auger unit including a motor driven auger and an auger tube, (b) a feed hopper secured to one end of said tube with said auger extended into the feed hopper, (c) said tube including a series of tube sections each having a pair of inclined spaced slot edges at one side and together defining a continuous feed discharge slot inclined in a direction away from said feed hopper, (d) stands supporting said tube at the junctions of said tube sections, (e) said auger being comprised of a series of auger sections secured in end-to-end assembly together, (f) clamp means for joining said tube sections in end-to-end assembly together, with said inclined slot edges on each of said tube sections being in alignment with the slot edges on adjacent tube sections, (g) said clamp means including a series of angular C-shaped clamp sections secured on the exterior of said sections leaving the slot defined by the slot edges unobstructed, (h) said clamp means having means securing vertical legs of said angular C-shaped clamp sections in assembly together, rollers mounted on said stands, with said vertical legs of each joined together pair of said clamp sections being supported on said rollers, (i) detachable means attached to one of said stands and to said tube for adjustably fixing one end of said conveyor tube against rotation, and (j) means including a locking device connected to said hopper at an opposite end of said tube for rotating the hopper and the tube on said rollers and for locking the inclined slot on said rotated tube in an adjusted position.

10. A conveyor for evenly distributing animal feed along the length of a feed bunk comprising:

(a) an auger unit including a motor driven auger and an auger tube, (b) a feed hopper secured to one end of said tube with said auger extended into the feed hopper, (c) said tube including a series of tube sections each having a pair of inclined spaced slot edges at one side and together defining a continuous feed discharge slot inclined in a direction away from said feed hopper, (d) stands supporting said tube at the junctions of said tube sections, (e) said auger being comprised of a series of auger sections secured in end-to-end assembly together, (f) clamp means for joining said tube sections in end-to-end assembly together, with said inclined slot edges on each of said tube sections being in alignment with the slot edges on adjacent tube sections, (g) said clamp means including a series of angular C-shaped clamp sections secured on the exterior of said sections leaving the slot defined by the slot edges unobstructed, (h) said clamp means having means securing vertical legs of said angular C-shaped clamp sections in assembly together, rollers mounted on said stands, with said vertical legs of each joined together pair of said clamp sections being supported on rollers, (i) means attached to one of said stands and to said tube for adjustably fixing one end of said tube against rotation, (j) a hopper support stand, (k) a sleeve mounted on said stand, (l) a rotary shaft journaled in said sleeve and joined at one end with a hopper rotating radial arm fixedly connected to said hopper, (m) a plate having a pair of slots and fixedly mounted on said sleeve, (n) an axial support arm extending parallel with said rotary shaft being journaled in one of the slots on said plate, (o) a radial arm secured at one of its ends to said rotary shaft and at opposite end to said axial support arm, (p) an adjusting screw secured to said hopper support stand at one end and being threaded through said axial support arm for rotating said hopper and tube upon rotation of said adjusting screw to adjust said inclined slot, and (q) a locking device fixedly connected at one end with said hopper and journaled in another of the slots in said plate to lock said hopper, tube and inclined slot in an adjusted position.

11. A conveyor for evenly distributing an animal feed along the length of a feed bunk comprising:

(a) an auger assembly including a motor driven auger and an auger tube, (b) a feed hopper secured to one end of said tube with said auger extended into the feed hopper, (c) said tube including a series of tube sections each co-extensive in length and each having an identical pair of inclined spaced slot edges at one side, said slot edges on said sections together defining a continuous feed discharge slot inclined downwardly in a direction away from said feed hopper, (d) stands supporting said tube at the junctions of said tube sections, (e) said auger being comprised of a series of auger sections secured in end-to-end assembly together, (f) clamp means for joining said tube sections in end-to-end assembly together, with said inclined slot edges on each of said tube sections being in alignment with the slot edges on adjacent tube sections, (g) said clamp means including a series of angular C-shaped clamp sections secured on the exterior of said sections so that the slot defined by the slot edges is unobstructed, (h) means on said clamp means securing vertical legs of said angular C-shaped clamp sections in assembly together, (i) rollers mounted on said stands, with said vertical legs of each joined together pair of said clamp sections being supported on said rollers, the rollers each having a width greater than the combined width of the vertical legs of the joined together pair of clamp sections, (j) detachable means attached to one of said stands and to said tube for adjustably fixing one end of said tube against rotation, and (k) means including a locking device connected to said hopper at an opposite end of said tube for rotating the hopper and the tube on said rollers and for locking the inclined slot on said rotated tube in an adjusted position.

References Cited by the Examiner

UNITED STATES PATENTS

| | | | |
|---|---|---|---|
| 559,338 | 4/96 | Lorenz | 198—213 |
| 1,937,663 | 12/33 | Norton. | |
| 1,980,308 | 11/34 | Adams. | |
| 2,630,906 | 3/53 | Philipp | 198—64 |
| 2,867,314 | 1/59 | Hansen | 198—64 |
| 3,037,611 | 6/62 | Majorowicz | 198—64 |

SAMUEL F. COLEMAN, *Primary Examiner.*

JULIUS E. WEST, WILLIAM B. LA BORDE,
*Examiners.*